UNITED STATES PATENT OFFICE 2,289,327

DECOLORIZATION OF TITANIUM TETRAHALIDES

Alphonse Pechukas, Akron, Ohio, assignor to Pittsburgh Plate Glass Company, Allegheny County, Pa., a corporation of Pennsylvania No Drawing. Application December 7, 1939, Serial No. 308,008

17 Claims. (Cl. 23—87)

This invention relates to a method of purifying titanium halides and is particularly directed to the removal of color bodies and other impurities from titanium tetrachloride. Titanium tetrachloride as generally prepared by chlorination of titanium bearing materials such as ilmenite generally possesses a yellow or dark brown color which is largely due to the presence of certain impurities in small amounts, such as iron, vanadium, molybdenum or unidentified organic impurities. Many of these impurities have low boiling points and are distilled with the titanium tetrachloride. In accordance with the present invention, I have found that a large portion of these impurities may be removed by treating the tetrachloride with a reactive sulphide such as hydrogen sulphide. Other reactive sulphides or hydrosulphides such as organic mercaptans, for example, methyl or ethyl mercaptans, reactive inorganic sulphides such as arsenious or cuprous sulphide, antimony trisulphide, etc., may be used. Sodium, boron, tin, calcium, mercury, and iron sulphides also may be used. However, the reaction is slower in such cases and for this reason it is sometimes found desirable to use the sulphides previously mentioned.

Upon treatment of the titanium tetrachloride with a reactive sulphide such as hydrogen sulphide, a brown or black precipitate is formed which contains a portion of the impurities. For example, a large portion of the vanadium and iron is removed in this manner. Other materials such as arsenic, antimony or tin may be precipitated to a substantial degree, if such materials are present. In some cases a small quantity of titanium is precipitated, but in general, treatment is discontinued before more than two or three percent of the titanium is precipitated. Precipitation of an excessive quantity of titanium tetrachloride may be avoided by use of hydrogen sulphide which is diluted with an inert gas such as nitrogen, carbon dioxide, dry air, etc. If desired, the process may be conducted by treating with hydrogen sulphide complexes such as the addition compounds formed by reaction of $H_2S$ and titanium tetrachloride or other titanium tetrahalide. These materials may be prepared, for example, by introduction of $H_2S$ under pressure into titanium tetrachloride. The mixture thus obtained may be added to the titanium tetrachloride to be treated.

It has been found that the hydrogen sulphide not only removes precipitable impurities but that the precipitate which is formed adsorbs or absorbs other impurities, thus promoting a more complete removal of the color bodies in the titanium tetrachloride. Thus, the color of the titanium tetrachloride may be lightened by treatment with precipitates which were obtained in a previous treatment of colored titanium tetrachloride with hydrogen sulphide or equivalent compound.

The precipitate may be removed from the liquid tetrachloride by decantation and/or filtration or the liquid may be distilled from the precipitate. Prior to distillation, the liquid is generally dark red in color. This color is largely due to the conversion of certain of the impurities which are not precipitated to a different form. Upon distillation, however, titanium tetrachloride of good color is secured. Thus, it is found that many of the unprecipitated impurities are converted into products possessing high boiling points and no longer distill with the titanium tetrachloride.

The treatment is conducted generally at or near room temperature, although higher or lower temperatures are permissible. In certain cases, vaporized titanium tetrachloride may be contacted with hydrogen sulphide for the purpose of purifying the tetrachloride but undesirable large amounts of titanium sulphide may be formed in such a process, unless the proportions of hydrogen sulphide to titanium tetrachloride is kept low. The treatment may be conducted under pressure, if desired.

The process is generally conducted in the substantial absence of chlorine, hydrogen chloride, or water vapor in order to avoid additional reactions which tend to complicate the problem. Thus it will be apparent that the liquid undergoing treatment is substantially anhydrous. The residual liquor after treatment with $H_2S$ may be treated with inert gases to remove $H_2S$ or may be subjected to the action of sulphur dioxide to remove the hydrogen sulphide. Treatment with sulphur dioxide in this manner generally produces a product of higher purity and better color.

The following examples are illustrative:

*Example I.*—A stream of gaseous hydrogen sulphide was introduced into a quantity of yellow titanium tetrachloride containing 0.25 percent of vanadium and 0.0002 percent of iron at a temperature of 25° C. and a brownish black precipitate was formed. Upon removal of the precipitate the liquid titanium tetrachloride was dark red. The red liquor was distilled and practically pure water-white titanium tetrachloride which was free of vanadium and iron was secured.

*Example II.*—2.5 parts by weight of arsenious sulphide was mixed with 180 parts by weight of yellow titanium tetrachloride which contained a small amount of vanadium. The mixture was then distilled and water-white titanium tetrachloride was obtained.

Although the present invention has been decribed with reference to the specific details of certain embodiments therein, it is not intended that such details shall be regarded as limitations upon the scope of the invention, except insofar as included in the accompanying claims.

I claim:

1. A method of purifying a substantially anhydrous titanium tetrahalide which contains a metallic impurity which comprises precipitating impurities therefrom by means of a reactive sulphide.

2. A method of purifying substantially anhydrous liquid titanium tetrachloride which contains a metallic impurity which comprises precipitating impurities therefrom by means of a reactive sulphide.

3. A method of removing color from impure colored substantially anhydrous titanium tetrachloride which comprises precipitating impurities therefrom by means of a reactive sulphide and distilling the titanium tetrachloride.

4. A method of purifying substantially anhydrous titanium tetrahalide which contains a metallic impurity which comprises precipitating impurities therefrom by means of hydrogen sulphide.

5. A method of purifying substantially anhydrous liquid titanium tetrachloride which contains a metallic impurity which comprises precipitating impurities therefrom by means of hydrogen sulphide.

6. A method of removing color from impure colored substantially anhydrous titanium tetrachloride which comprises precipitating impurities therefrom by means of hydrogen sulphide and distilling the titanium tetrachloride.

7. The process of claim 1 wherein the sulphide is arsenious sulphide.

8. The process of claim 2 wherein the sulphide is arsenious sulphide.

9. The process of claim 3 wherein the sulphide is arsenious sulphide.

10. The process of claim 1 wherein the sulphide is a reaction product of titanium tetrahalide and hydrogen sulphide.

11. The process of claim 2 wherein the sulphide is a reaction product of titanium tetrahalide and hydrogen sulphide.

12. The process of claim 3 wherein the sulphide is a reaction product of titanium tetrahalide and hydrogen sulphide.

13. A method of removing a vanadium compound from substantially anhydrous liquid titanium tetrachloride which comprises treating the tetrachloride with a reactive sulphide to form a precipitate containing a major portion of the vanadium.

14. The process of claim 13 wherein the sulphide is hydrogen sulphide.

15. A method of purifying substantially anhydrous titanium tetrahalide which contains a metallic impurity which comprises contacting the halide in vapor state with a reactive sulphide.

16. A method of purifying substantially anhydrous titanium tetrahalide containing a metallic impurity which comprises contacting the same with a reactive sulphide and distilling the treated titanium tetrahalide.

17. The process of claim 16 in which the reactive sulphide is hydrogen sulphide.

ALPHONSE PECHUKAS.